(12) United States Patent
Minh

(10) Patent No.: US 6,649,296 B1
(45) Date of Patent: Nov. 18, 2003

(54) UNITIZED CELL SOLID OXIDE FUEL CELLS

(75) Inventor: Nguyen Q. Minh, Fountain Valley, CA (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 0 days.

(21) Appl. No.: 09/419,343

(22) Filed: Oct. 15, 1999

(51) Int. Cl.⁷ .............................. H01M 2/00; H01M 2/08
(52) U.S. Cl. ................ 429/34; 429/35; 429/38
(58) Field of Search .............. 429/34, 35, 38, 429/39, 41, 32

(56) References Cited

U.S. PATENT DOCUMENTS

| | | |
|---|---|---|
| 3,776,777 A | 12/1973 | Houpert et al. |
| 4,913,982 A | 4/1990 | Kotchick et al. |
| 5,063,122 A | 11/1991 | Rohr |
| 5,162,167 A | 11/1992 | Minh et al. |
| 5,187,025 A | 2/1993 | Kelland et al. |
| 5,256,499 A | 10/1993 | Minh et al. |
| 5,286,322 A | 2/1994 | Armstrong et al. |
| 5,290,642 A | 3/1994 | Minh et al. |
| 5,360,681 A | 11/1994 | Jaspers et al. ............ 429/34 |
| 5,543,240 A | 8/1996 | Lee et al. |
| 5,741,605 A | 4/1998 | Gillett et al. |
| 5,827,620 A | 10/1998 | Kendall |
| 5,861,221 A | 1/1999 | Ledjeff et al. |
| 5,882,809 A | 3/1999 | McPheeters et al. |

FOREIGN PATENT DOCUMENTS

| | | |
|---|---|---|
| EP | 0 275 661 | 7/1988 |
| EP | 0 406 523 A1 | 1/1991 |
| EP | 0 524 326 A1 | 1/1993 |
| JP | 4-12468 | 1/1992 |
| JP | 4-12470 | 1/1992 |

*Primary Examiner*—Carol Chaney
*Assistant Examiner*—Tracy Dove
(74) *Attorney, Agent, or Firm*—Sutherland Asbill & Brennan LLP

(57) ABSTRACT

A unitized solid oxide fuel cell comprises a first electrically conductive interconnect operatively connected to an anode of the fuel cell, with the first interconnect having a first substantially planar portion and a first skirt portion. A second electrically conductive interconnect is operatively connected to a cathode of the fuel cell, with the second interconnect having a second substantially planar portion and a second skirt portion that is juxtaposed to the first skirt portion. A gas inlet is fixed to at least one of the first and second skirt portions while a gas outlet is fixed to at least one of the first and second skirt portions. The gas inlet and outlet can be releasably attached to a gas manifold.

25 Claims, 4 Drawing Sheets

UNITIZED CELL SOLID OXIDE FUEL CELLS

BACKGROUND OF THE INVENTION

This invention generally relates to solid oxide fuel cells. More particularly, the present invention relates to an improved solid oxide fuel cell design that allows multiple cells to be interconnected in both series and parallel, while allowing a single cell in a stack of cells to be removed and replaced.

A fuel cell is basically a galvanic conversion device that electrochemically reacts a fuel with an oxidant within catalytic confines to generate a direct current. A fuel cell typically includes a cathode material that defines a passageway for the oxidant and an anode material that defines a passageway for the fuel. An electrolyte is sandwiched between and separates the cathode and anode materials. An individual electrochemical cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

The fuel and oxidant fluids are usually gases and are continuously passed through separate cell passageways. Electrochemical conversion occurs at or near the three-phase boundary of the gas, the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that diffuse through the electrolyte to the anode. The electrons flow from the anode through an external circuit and then to the cathode, with the circuit being closed internally by the transport of oxide ions through the electrolyte.

In a SOFC, the electrolyte is in a solid form. Typically, the electrolyte is made of a nonmetallic ceramic, such as dense yttria-stabilized zirconia (YSZ) ceramic, that is a nonconductor of electrons which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the anode oftentimes being made of nickel/YSZ cermet and the cathode oftentimes being made of doped lanthanum manganite. In the solid oxide fuel cell, hydrogen or a hydrocarbon is commonly used as the fuel, while oxygen or air is used as the oxidant.

As mentioned above, the voltage output of a single fuel cell is far to low for many applications. Thus, it frequently becomes necessary to connect multiple fuel cells in series. Additionally, the power demands of many systems require that fuel cells frequently be connected in electrically parallel circuits, thereby providing a greater total current. The physical stacking of multiple fuel cells in series, parallel or series/parallel configuration, however, must incorporate gas-tight connections to allow for a safe and efficient flow of reaction gases. Typically, a group of individual fuel cells are welded, soldered or otherwise bonded together into a single unitary stack, thereby preventing the improper mixing of the reaction gasses, such as in U.S. Pat. No. 5,861,221. Accordingly, if one cell must be removed and replaced, such as for testing, the remaining cells are destroyed in the process. This leads to significant losses in time and money.

For example, defects can occur during firing of the cell materials, which negatively affect the performance of the fuel cell. Where adjacent cells are fused or bonded together into a single unitary stack, a single cell that is defectively formed cannot be removed and interchanged with a non-defective cell. At best, the performance of the fuel cell stack becomes impaired. At worst, the entire stack must be discarded due to the failure of a single cell.

An examination of the prior art reveals that the various constructions adopted in stacking multiple fuel cells in series and/or parallel fall short of easy replacement of individual fuel cells. In U.S. Pat. No. 3,776,777, an array of fuel cells forms a hollow cylinder. A series electrical connection is established by joining two half-cylinder portions. Electrodes are configured in bands across the inner and outer surfaces of the half-cylinder. An oxidizing agent is exposed to the outside of the cylinder, and a hydrogen fuel flows through the hollow center of the cylinder. The half-cylindrical portions are cemented together either by welding, or applying a ceramic or vitreous sintered layer. Thus, if a single fuel cell becomes defective, the entire cylinder must be discarded. Additionally, the geometric shape limits the use of such a structure where space is a limitation. It is not "stackable" in the geometric sense that a stack of essentially flat, thin fuel cells would form.

A unitary modular fuel cell stack in U.S. Pat. No. 5,741, 605 can be fabricated outside a power generator and subsequently mounted therein. Each stack includes a plurality of tubular solid oxide fuel cells "bundled" into a semi-rigid unit. When a stack malfunctions, the stack may be removed without shutting down the entire power generation plant. No discussion, however, is offered on the design of a cell that can be individually removed from a stack.

U.S. Pat. No. 5,882,809 claims to provide individual cells in a stack that can be individually interchanged without impairing the stack, but only in the absence of high power density. The cells are individually sintered and mechanically held together. The mechanical means can include external clamps, springs or weights, although employing the same is not specifically described. Nevertheless, it can be surmised that such external components can only add to complexity in design and limitations in use. Further, there appears to be no discussion of how the individual cells are manifolded to fuel and oxidant gases while maintaining the ability to be individually removed.

As can be seen, there is a need for a unitary solid oxide fuel cell that can be removably installed in a fuel cell stack. Also needed is a unitary cell that can be replaced from a fuel cell stack without impairing the performance of the overall stack, such as by damaging adjoining cells. Another need is for a unitary cell that can be in a series and/or parallel electrical configuration with other fuel cells. An individual fuel cell and fuel cell stack design that is simple and cost effective is also needed. Yet a further need is for an individual cell and fuel cell stack design that does not require precise alignment from one cell to the next so as to prevent overall stack misalignment. In other words, a fuel stack design is needed that does not require precise flatness from one cell to the next.

SUMMARY OF THE INVENTION

The present invention provides a unitized fuel cell comprising a first electrically conductive interconnect operatively connected to an anode of the fuel cell, with the first interconnect having a first substantially planar portion and a first skirt portion; a second electrically conductive interconnect operatively connected to a cathode of the fuel cell, with the second interconnect having a second substantially planar portion and a second skirt portion, with the second skirt portion being juxtaposed to the first skirt portion; a gas inlet fixed to at least one of the first and second skirt portions; and a gas outlet fixed to at least one of the first and second skirt portions, whereby the gas inlet and outlet can be releasably attached to a gas manifold.

In another aspect of the present invention, a solid oxide fuel cell stack has a plurality of unitized solid oxide fuel cells, at least one unitized cell comprising (a) a first electrically conductive interconnect operatively connected to an anode of the one fuel cell, with the first conductive interconnect having a first substantially planar portion and a first skirt portion; (b) a second electrically conductive interconnect operatively connected to a cathode of the one fuel cell, with the second conductive interconnect having a second substantially planar portion and a second skirt portion, and the second skirt portion being juxtaposed to said first skirt portion; (c) a first salient formed by a portion of at least one of the first and second skirt portions, with first salient being disposed at a first edge of the one fuel cell; and (d) a second salient formed by a portion of at least one of the first and second skirt portions, with the second salient being disposed at a second edge of the one fuel cell; and a plurality of gas interconnects that releasably connect the first and second salients to a plurality of gas manifolds, whereby the unitized cells are disposed in the fuel cell stack in the absence of being fixed to one another such that a single unitized cell can be removed and replaced in the fuel cell stack.

These and other features, aspects and advantages of the present invention will become better understood with reference to the following drawings, description and claims.

DETAILED DESCRIPTION OF THE INVENTION

Figure 1:
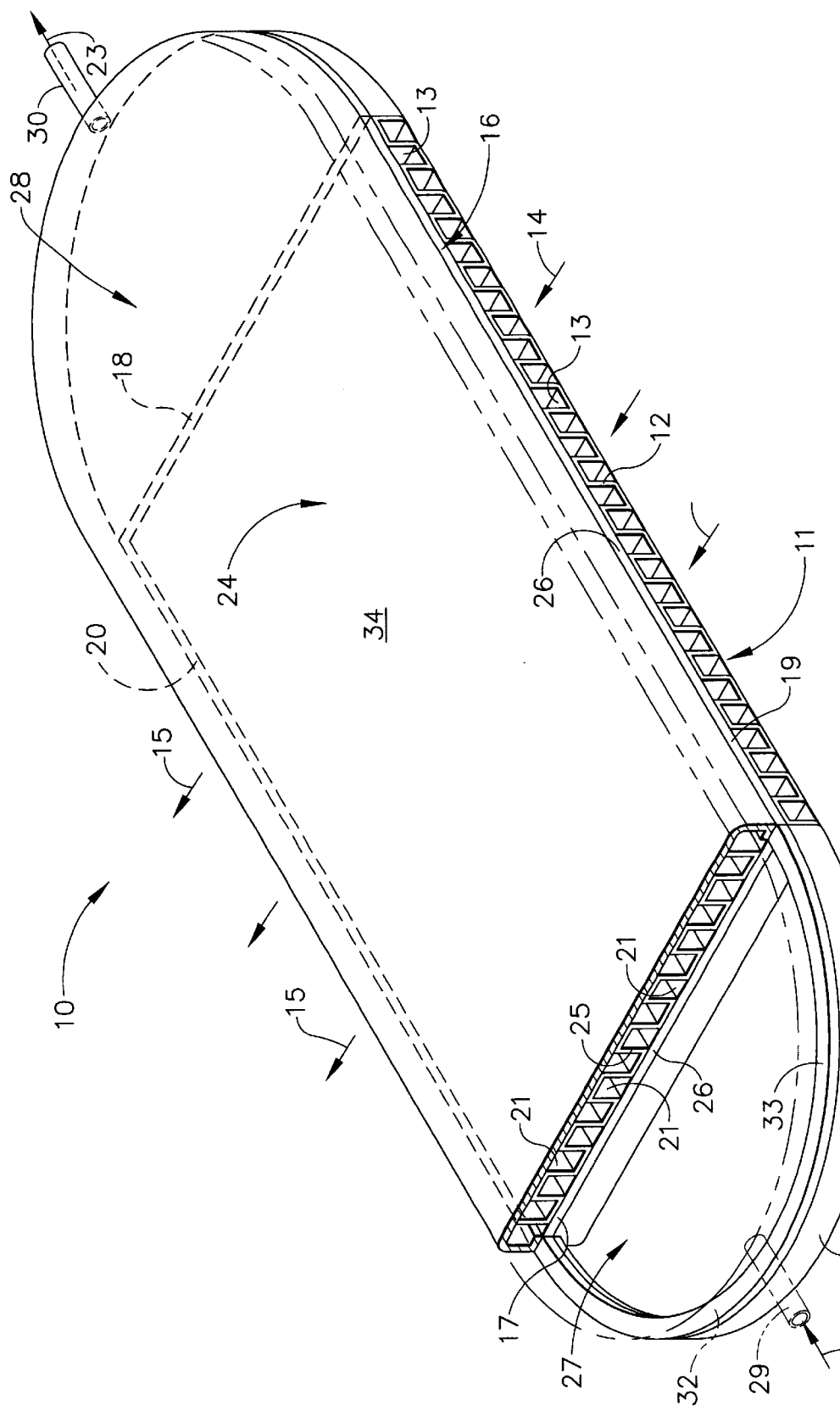
FIG. 1 is a perspective view of a unitized solid oxide fuel cell according to one embodiment of the present invention.
Figure 4:
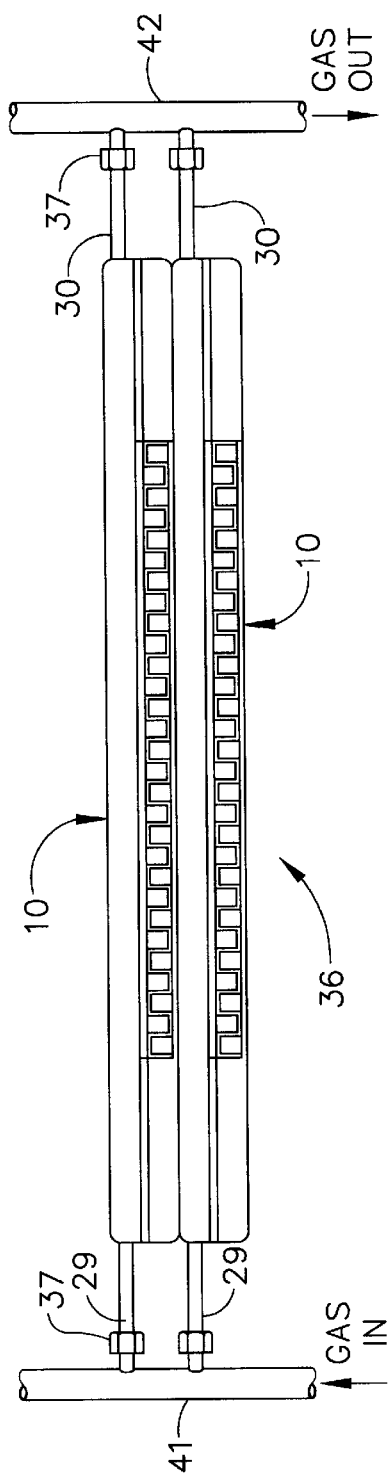
FIG. 4 depicts a stack of unitized fuel cells in a series electrical connection according to an embodiment of the present invention.
Figure 5:
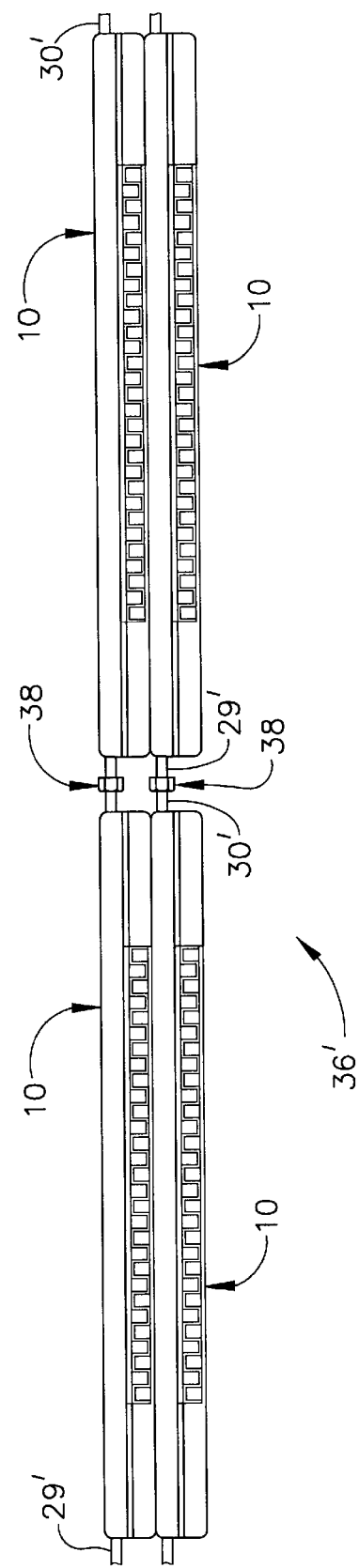
FIG. 5 depicts a stack of unitized fuel cells in both a series and parallel electrical connection according to an embodiment of the present invention.

FIG. 1 discloses one embodiment of a unitized solid oxide fuel cell 10 that can be incorporated into a solid oxide fuel stack, such as that shown in FIGS. 4 and 5. While the present invention preferably contemplates that each of the unitized cells 10 in a stack be identical, it is also contemplated that the unitized cells 10 can be different. Further, while the embodiments of the present invention are described in the context of solid oxide fuel cells, the present invention may be used in the context of other types of fuel cells.

The unitized cell 10 shown in FIG. 1 includes a substantially flat and rectangular shaped electrolyte wall 16. The wall 16 is therefore defined by two pairs of opposing edges—a first edge 17 opposed to a second edge 18 and a third edge 19 opposed to a fourth edge 20. However, configurations other than rectangular are within the contemplation of the present invention. The electrolyte wall 16 is constructed with an anode layer, a cathode layer, and an electrolyte layer sandwiched therebetween (not shown). The trilayer construction of the electrolyte wall 16 is according to any well-known construction in the art. Examples of such construction can be found in U.S. Pat. Nos. 5,256,499; 5,162,167; and 4,913,982. Accordingly, and wherein the unitized cell 10 is of the solid oxide fuel type, the composition of the anode layer, cathode layer, and the electrolyte layer can be of any well-known elements in the art. For example, the anode layer can be made of a nickel/YSZ cermet, while the cathode layer can be made of a doped lanthanum manganite. The electrolyte layer can be made of a dense yttria-stabilized zirconia.

The method of making the anode layer, cathode layer, and the electrolyte layer can likewise be by any well-known method practiced in the art, such as tape calendering. Examples of tape calendering are described in U.S. Pat. Nos. 5,286,322 and 5,162,167, The thicknesses of the three layers can vary. In practice, however, thicknesses of the layers can each range from about 0.1 to 100 mils.

Immediately adjacent to and electrically fixed to opposing planar surfaces of the electrolyte wall 16 are first and second cell components 12, 25. In one embodiment, the cell components are portions of two electrodes and, in another embodiment, they are portions of two interconnects 11, 24 further described below. In the case where the first and second cell components 12,25 are portions of electrodes, the first and second cell components 12, 25 comprise an anode and cathode that are respectively disposed adjacent the anode and cathode layers of the electrolyte wall 16. Thus, in this particular embodiment wherein the anode layer of the electrolyte wall 16 is the bottom layer, when viewed from FIG. 1, the electrode 12 is the anode and the electrode 25 is the cathode. Nevertheless, it can be understood that the anode/cathode orientation seen in FIG. 1 can be reversed when the orientation of the electrolyte wall 16 is reversed. As practiced in the art, the anode 12 and the cathode 25 can be made of the same materials respectively used for the anode and cathode layers in the electrolyte wall 16.

As mentioned above, in an alternative embodiment, the cell components 12, 25 can be portions of a first interconnect 11 and a second interconnect 24, respectively. Such a construction is know in the art and shown, for example, in U.S. Pat. No. 5,290,642 which is incorporated herein by reference. In such instance, the cell components 12, 25 are disposed adjacent to the anode and cathode layers of the electrolyte wall 16. Thus, the anode layer and cathode layer of the electrolyte wall 16 functions as the anode and cathode, respectively. The cell components 12, 25 could then be made of the same material used for the interconnects 11, 24.

While the shape of both cell components 12, 25 is shown as corrugated, other configurations such as ribs and fins can be used. Also, while the cell components 12, 25 are depicted with the same configuration, the present invention contemplates that each component can have a different configuration. Irrespective of the particular configurations of the components 12, 25, each provide channels for the flow of gases. The cell component 12 provides first or fuel channels 13 that extend from the third edge 19 and to the fourth edge 20 of the electrolyte wall 16. Second or oxidant channels 21 are provided by the cell component 25 and extend between the first and second edges 17, 18 of the electrolyte wall 16. Thereby, a gas or fuel 14 can enter the fuel channels 13, undergo an electrochemical reaction as known in the art, and then exit the fuel channels 13 as a fuel exhaust 15. At the same time, a gas or oxidant 22 can enter the oxidant channels 21, undergo an electrochemical reaction, and then exit the oxidant channels 21 as a gas or oxidant exhaust 23.

The first channels 13 are also partly formed by a planar portion of the first electrically conductive interconnect 11 immediately adjacent to and electrically fixed to the first cell component 12. Similarly, the second channels 21 are partly formed by a planar portion of the second electrically conductive interconnect 24 immediately adjacent to and electrically fixed to the second cell component 25. When viewed from FIG. 1, the first interconnect 11 serves as a bottom surface of the cell 10, while the second interconnect 24 serves as a top surface of the cell 10. Preferably, both interconnects 11, 24 are of a single piece construction and made of an oxidation resistant metal which, for example, can be nickel chromium or iron chromium based. With such construction, the interconnects 11, 24 can pass an electrical current from one cell 10 to another in a stack of cells 10, as is known in the art.

The first and second interconnects 11, 24 are similarly sized and configured in the embodiment shown in FIG. 1. Each interconnect 11, 24 includes the substantially planar portion mentioned above and a lip or skirt portion disposed at each of two opposing edges of the planar portion. The skirt portions are juxtaposed to one another, and extend substantially perpendicular away from the planar portion as well as towards the planar surfaces of the electrolyte wall 16.

As best seen in FIG. 1, the planar portion 34 of the second interconnect 24 is of a width substantially equal to that defined by the opposing third and fourth edges 19, 20 of the electrolyte wall 16. The length of the planar portion 34 extends beyond that defined by the opposing first and second edges 17, 18 of the electrolyte wall 16. A second skirt portion 32 of the second interconnect 24 can be seen in FIGS. 1 and 2 as being adjacent to and circumscribing the first edge 17. Likewise, another second skirt portion 32 is adjacent to and circumscribes the second edge 18 (FIG. 1). As with the second interconnect 24, a first skirt portion 31 of the first interconnect 11 is adjacent to and circumscribes the first edge 17. Another first skirt portion 31 is similarly adjacent to and circumscribes the second edge 18. With the skirt portions 31, 32 only circumscribing the first and second edges 17, 18 of the electrolyte wall 16, the third and fourth edges 19, 20 are left exposed.

Figure 2:
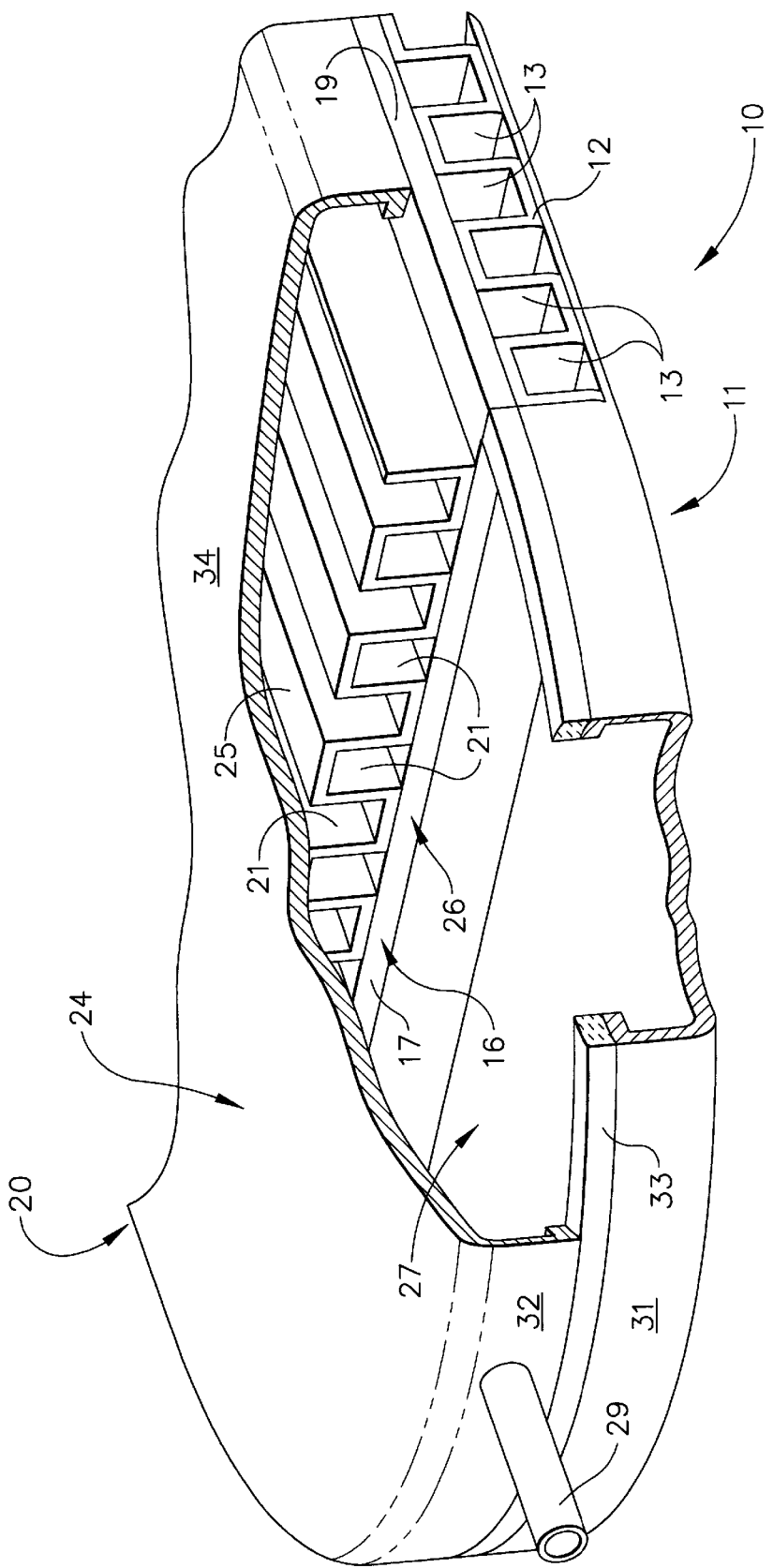
FIG. 2 is a partial perspective view of the unitized fuel cell shown in FIG. 1 and which has been cut away to show the internal structure of the cell.

The skirt portions in combination with the distal ends of the planar portions of the first and second interconnects 11, 24 form first and second salients 27, 28. The salient 27, 28 are positioned at the first and second edges 17, 18, respectively of the electrolyte wall 16. As shown in FIGS. 1 and 2, the first salient 27 provides a void space that allows an oxidant gas, such as air, to enter the unitized cell 10 through an oxidant inlet 29, enter the first salient 27, and then pass into the oxidant channels 21. The second salient provides a void space that allows the oxidant gas to exit the oxidant channels 21, pass into the second salient 28, and then exit the unitized cell 10 through an oxidant outlet 30.

In terms of fuel gas flow into and out of the unitized cell 10, as noted above, the unitized cell 10 shown in FIG. 1 is only partially enclosed. The partial enclosure is the result of the first and second interconnects 11, 24, and specifically the skirt portions 31, 32, circumscribing only the first and second edges 17, 18 of the electrolyte wall 16. The portion of the unitized cell 10 remaining open is at the third and fourth edges 19, 20 and adjacent to the anode 12 and fuel channels 13. With the fuel channels 13 being open, it can be appreciated by those skilled in the art that a manifolds can be used to direct fuel into and out of the fuel channels 13. Such manifolds can be directly affixed to the unitized cell 10 and can be constructed as simply as a chamber. Alternatively, the unitized cell 10 can be enclosed within a single chamber filled with a fuel gas, thereby providing fuel to the fuel channels 13.

In order to seal the oxidant channels 21 from the fuel channels 13, a sealant 26, as seen in FIG. 1, is disposed along the first edge 17 of the electrolyte wall 16 and adjacent the cell component 25. Having the oxidant channels 21 sealed from the fuel channels 13 prevents the admixing of fuel and oxidant. A similar sealant 26 is disposed along the third edge 19 of the electrolyte wall 16. Another pair of sealants 26 (not shown) are disposed along the second and fourth edges 18, 20 of the electrolyte wall 16 adjacent the cell component 12 to also aid in preventing the admixing of fuel and oxidant. The sealants 26 can be made of various materials such as cement, glass and glass ceramic. Using the foregoing materials, the sealants 26 can be affixed to the electrolyte wall 16 by methods such as filling or painting.

For the embodiment of the unitized cell 10 shown in FIGS. 1 and 2, a gasket 33 between the first and second skirt portions 31, 32 seals the void spaces of the first and second salients 27, 28. The gasket 33 is made of an electrically insulating material such as ceramic or glass to also prevent short-circuiting between cell components 12, 25.

Figure 3:
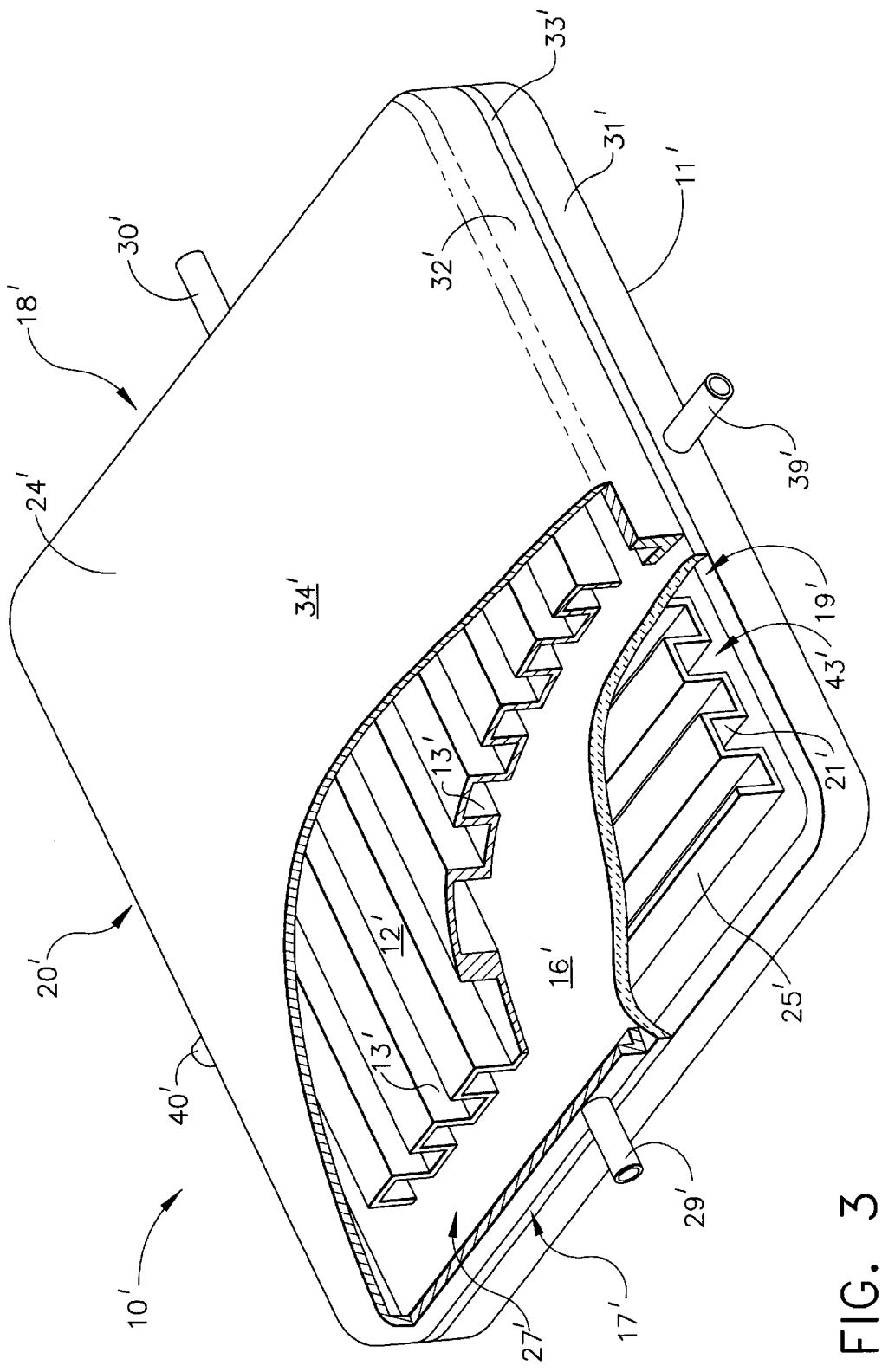
FIG. 3 is a perspective view of a unitized solid oxide fuel cell according to another embodiment of the present invention.

FIG. 3 depicts another embodiment of the unitized cell 10'. A primary difference between this embodiment and the embodiment shown in FIGS. 1 and 2 is that the former is completely enclosed. The unitized cell 10' includes an electrolyte wall 16' having a first edge 17', a second edge 18', a third edge 19', and a fourth edge 20'. The electrolyte wall 16' is disposed between first cell component 12' and a second cell component 25'. However, in contrast to the above embodiment, the electrolyte wall 16' extends beyond the perimeters of the first and second cell components 12', 25' and to first and second interconnects 11', 24'. Fuel channels 13' and oxidant channels 21' are provided by the first cell component 12' and second cell component 25', respectively. A sealant 26' seals the areas of the fuel channels 13' at the first and second edges 1 7',18'. Another sealant 26' seals the areas of the oxidant channels 21' at the third and fourth edges 19', 20'.

In this second embodiment, the first interconnect 11' and the second interconnect 24' sandwich the electrolyte wall 16, first cell component 12' and second cell component 25' therebetween. Each interconnect 11' and 24' includes a planar portion and a skirt portion. However, and unlike the first embodiment above, a first skirt portion 31' extends about the entire perimeter of the first interconnect 11' while a second skirt portion 32' likewise extends about the entire perimeter of the second interconnect 24'. Thereby, a first salient 27', a second salient (not shown), a third salient 43', and a fourth salient (not shown) are respectively provided adjacent the first edge 17', second edge 18', third edge 19' and fourth edge 20'. With four salients, an oxidant inlet 29' connected to the first salient 27' can feed an oxidant gas into the cell 10' while an oxidant outlet 30' fixed to the second salient can exhaust the oxidant from the cell 10'.

Additionally, and in contrast to the first embodiment, a fuel inlet 39' connected to a third salient can feed a fuel gas into the cell 10' while a fuel outlet 40' fixed to the fourth salient can exhaust the fuel from the cell 10'. The entire cell 10' is then sealed by a gasket 33' between the first and second skirts 31', 32'. The gasket 33' also electrically insulates the first cell component 12' from the second cell component 25'.

FIG. 4 depicts one embodiment of a solid oxide fuel cell stack 36. The fuel cell stack 36 comprises a plurality of unitized cells 10 arranged in a series electrical configuration. As such, the first interconnect 11 (not shown) of the upper cell 10 (when viewed from FIG. 4) is in electrical contact with the second interconnect 24 (not shown) of the lower cell 10. Affixed to each cell 10 are an inlet 29 and an outlet 30 (both of which may be used either for an oxidant or fuel). The inlets 29 are releasably attached to a first manifold 41 that brings a gas, such as an oxidant, to the cells 10. Similarly, the inlets 30 are releasably attached to a second manifold 42 that exhausts a gas, such as an oxidant, from the cells 10.

Electrically insulating connectors 37 serve to releasably connect the inlets 29 to the first manifold 41, as well as prevent short-circuiting. Likewise, electrically insulating connectors 37 releasably connect the outlets 30 to the second manifold 42 and prevent short-circuiting. Examples of suitable insulating connectors 37 include zirconia and alumina FIG. 5 depicts another embodiment of a solid oxide fuel cell stack 36'. The fuel cell stack 36' comprises a plurality of unitized cells 10' arranged in a series/parallel electrical configuration. The series electrical connection is established as in the above embodiment shown in FIG. 4. The inlets 29' of one set of series connected cells 10 can be releasably attached to an intake manifold (not shown) while the outlets 30' of the other set of series connected cell 10 can be releasably attached to an exhaust manifold (not shown). The outlets 30' of the first set of serially connected cells 10 are releasably attached to the inlets 29' of the other set of cells 10. Electrically insulating connectors 38 connect the outlets 30' to the inlets 29'. Examples of suitable insulating connectors 38 include zirconia and alumina.

As can be appreciated by those skilled in the art, the present invention provides a unitary solid oxide fuel cell that can be removably installed in a fuel cell stack. Also provided is a unitary cell that can be replaced from a fuel cell stack without impairing the performance of the overall stack, such as by damaging adjoining cells. The present invention further provides a unitary cell that can be in a series and/or parallel electrical configuration with other fuel cells. An individual fuel cell and fuel cell stack design that is simple and cost effective is also provided. The individual cell and fuel cell stack design of the present invention does not require precise flatness from one cell to the next. Additionally provided by the present invention is a relatively thin design profile.

It should be understood, of course, that the foregoing relates to preferred embodiments of the invention and that modifications may be made without departing from the spirit and scope of the invention as set forth in the following claims.

I claim:
1. A unitized fuel cell, comprising:
a first electrically conductive interconnect operatively connected to an anode of said fuel cell, said first interconnect having a first substantially planar portion and a first skirt portion;
a second electrically conductive interconnect operatively connected to a cathode of said fuel cell, said second interconnect having a second substantially planar portion and a second skirt portion, said second skirt portion being electrically insulated from said first skirt portion;
a gas inlet fixed to at least one of said first and second skirt portions; and
a gas outlet fixed to at least one of said first and second skirt portions,
whereby said gas inlet and said gas outlet are releasably attached to a gas manifold.

2. The cell of claim 1, further comprising a first salient formed by at least one of said first and second interconnects.

3. The cell of claim 1, further comprising an insulating gasket disposed between said first and second skirt portions.

4. The cell of claim 1, further comprising another first skirt portion, wherein said first skirt portion is disposed at a first edge of said fuel cell and said other first skirt portion is disposed at a second edge of said fuel cell, said first edge being opposed to said second edge.

5. The cell of claim 1, wherein said first and second skirt portions extend about only a portion of said fuel cell.

6. The cell of claim 1, wherein said first and second skirt portions extend about an entirety of said fuel cell.

7. A unitized solid oxide fuel cell, comprising:
a first electrically conductive interconnect operatively connected to an anode of said fuel cell;
a second electrically conductive interconnect operatively connected to a cathode of said fuel cell;
a first salient formed by a portion of at least one of said first and second interconnects, said first salient being disposed at a first edge of said fuel cell;
a second salient formed by a portion of at least one of said first and second interconnects, said second salient being disposed at a second edge of said fuel cell;
whereby said first and second salients are releasably attached to a gas manifold.

8. The cell of claim 7, further comprising a gas inlet fixed to at least one of said first and second salients.

9. The cell of claim 7, further comprising a gas outlet fixed to at least one of said first and second salients.

10. The cell of claim 7, wherein said first interconnect comprises a first substantially planar portion and a first skirt portion, said first planar portion and said first skirt portion forming a portion of said first and second salients.

11. The cell of claim 10, wherein said second interconnect comprises a second substantially planar portion and a second skirt portion, said second planar portion and said second skirt portion forming a portion of said first and second salients.

12. The cell of claim 7, further comprising an insulating gasket disposed between said first and second interconnects.

13. The cell of claim 11, wherein said first and second skirt portions extend about only a first edge and a second edge of said fuel cell, said first edge being opposed to said second edge.

14. The cell of claim 11, wherein said first and second skirt portions extend about an entirety of said fuel cell.

15. A unitized solid oxide fuel cell, comprising:
a first electrically conductive interconnect operatively connected to an anode of said fuel cell, said first interconnect having a first substantially planar portion and a first skirt portion;
a second electrically conductive interconnect operatively connected to a cathode of said fuel cell, said second interconnect having a second substantially planar portion and a second skirt portion;

a first salient formed by a portion of at least one of said first and second skirt portions, said first salient being disposed at a first edge of said fuel cell;

a second salient formed by a portion of at least one of said first and second skirt portions, said second salient being disposed at a second edge of said fuel cell; and an insulating gasket disposed between said first and second skirt portions, whereby said first and second salients are releasably attached to a gas manifold and said fuel cell includes means for electrically connecting said fuel cell with other fuel cells in series and parallel configurations.

16. The cell of claim 15, wherein said first edge is opposed to said second edge.

17. The cell of claim 16, further comprising a first gas inlet fixed to at least one of said first and second salients.

18. The cell of claim 16, further comprising a first gas outlet fixed to at least one of said first and second salients.

19. The cell of claim 16, further comprising a third salient and a fourth salient respectively disposed at third and fourth edges of said fuel cell.

20. The cell of claim 19, wherein said first and second skirt portions extend about an entirety of said fuel cell.

21. The cell of claim 20, further comprising a second gas inlet fixed to at least one of said third and fourth salients.

22. The cell of claim 20, further comprising a second gas outlet fixed to at least one of said third and fourth salients.

23. A solid oxide fuel cell stack, comprising:

a plurality of unitized solid oxide fuel cells, at least one unitized cell comprising:

(a) a first electrically conductive interconnect operatively connected to an anode of said one unitized cell, said first conductive interconnect having a first substantially planar portion and a first skirt portion;

(b) a second electrically conductive interconnect operatively connected to a cathode of said one unitized cell, said second conductive interconnect having a second substantially planar portion and a second skirt portion;

(c) a first salient formed by a portion of at least one of said first and second skirt portions, said first salient being disposed at a first edge of said one unitized cell; and (d) a second salient formed by a portion of at least one of said first and second skirt portions, said second salient being disposed at a second edge of said unitized cell;

a plurality of gas interconnects that releasably connect said first and second salients to a plurality of gas manifolds, whereby said unitized cells are removably disposed in said fuel cell stack in the absence of being fixed to one another such that a single unitized cell is replaceable in said fuel cell stack.

24. The fuel cell stack of claim 23, wherein said unitized cells are disposed in a series configuration.

25. The fuel cell stack of claim 23, wherein said unitized cells are disposed in a parallel configuration.

\* \* \* \* \*